United States Patent
Chen et al.

(10) Patent No.: US 8,185,718 B2
(45) Date of Patent: May 22, 2012

(54) CODE MEMORY CAPABLE OF CODE PROVISION FOR A PLURALITY OF PHYSICAL CHANNELS

(75) Inventors: Chun-Nan Chen, Taipei (TW); Ping Hsuan Tsu, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 930 days.

(21) Appl. No.: 12/203,326

(22) Filed: Sep. 3, 2008

(65) Prior Publication Data
US 2009/0198866 A1 Aug. 6, 2009

Related U.S. Application Data

(63) Continuation-in-part of application No. 12/025,076, filed on Feb. 4, 2008, now Pat. No. 7,991,042.

(51) Int. Cl.
*G06F 12/00* (2006.01)
(52) U.S. Cl. ...... 711/211; 341/70; 375/150; 342/357.68
(58) Field of Classification Search ............ None
See application file for complete search history.

(56) References Cited

U.S. PATENT DOCUMENTS
5,903,595 A    5/1999   Suzuki
6,804,290 B1  10/2004   King et al.
7,683,830 B2 *  3/2010   Montgomery et al. .. 342/357.29
2003/0202565 A1 10/2003   Li et al.
2006/0165283 A1 * 7/2006  DeWitt et al. ........... 382/173

FOREIGN PATENT DOCUMENTS
WO   WO 2007101454 A1 * 9/2007

OTHER PUBLICATIONS

German Office Action mailed Apr. 15, 2009.
Office Action cited in U.S. Appl. No. 12/025,076, dated Dec. 10, 2010.

* cited by examiner

*Primary Examiner* — Jared Rutz
*Assistant Examiner* — Gurtej Bansal
(74) *Attorney, Agent, or Firm* — Thomas|Kayden

(57) ABSTRACT

The invention provides a code memory capable of code provision for a plurality of physical channels. In one embodiment, the code memory comprises a selecting multiplexer, a core memory module, and a code buffer. The selecting multiplexer repeatedly latches on to a plurality of addresses generated by the physical channels according to a sequence of the physical channels to generate a code memory address signal. The core memory module stores code data, and retrieves the code data according to the code memory address signal to generate a code memory data signal. The code buffer respectively retrieves a plurality of code segments requested by the physical channels from the code memory data signal according to the sequence of the physical channels, and stores the code segments.

22 Claims, 19 Drawing Sheets

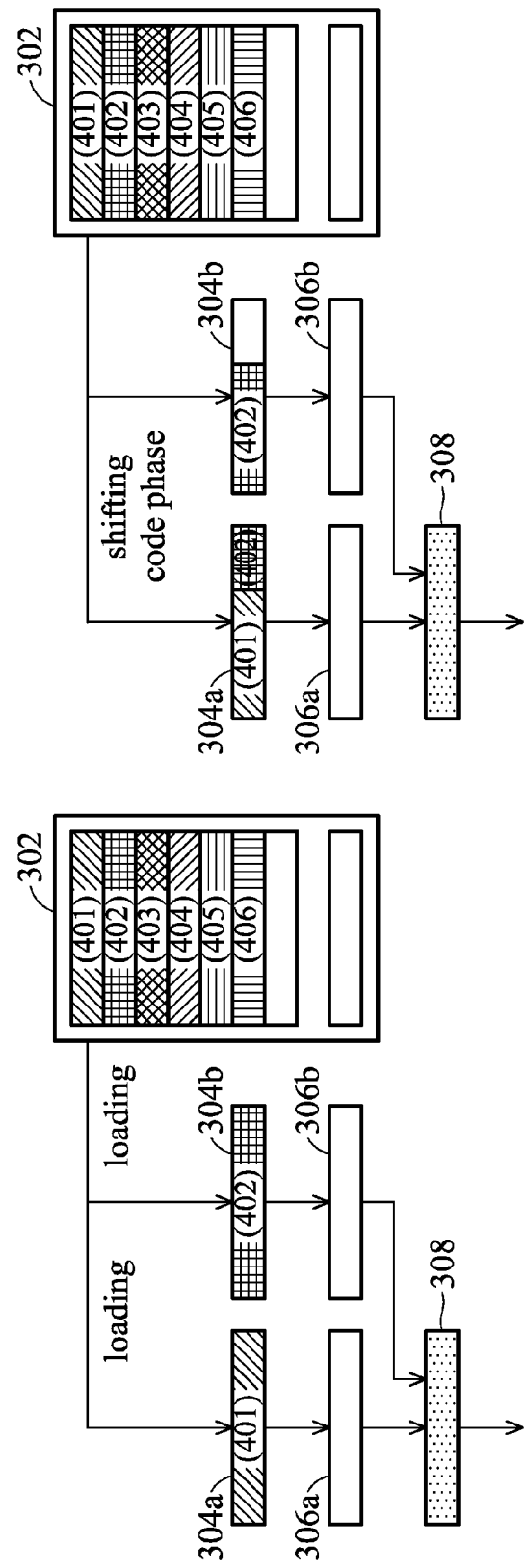

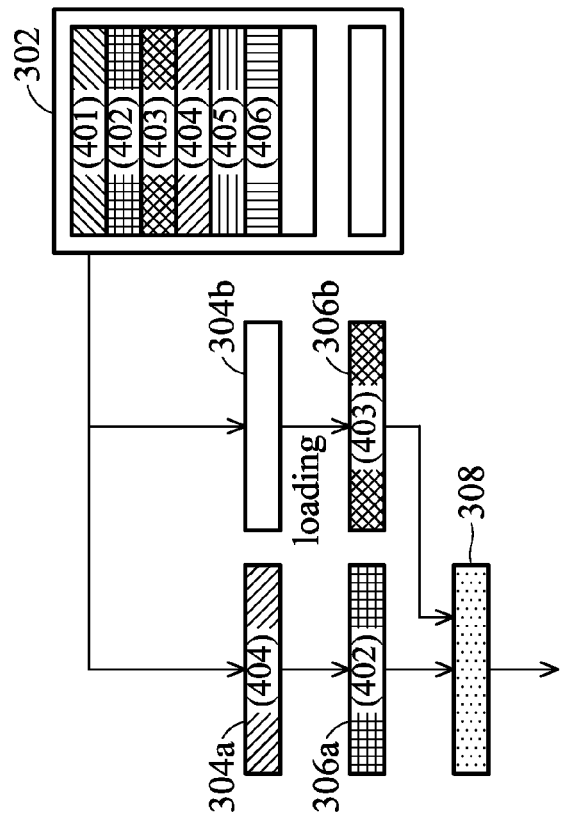
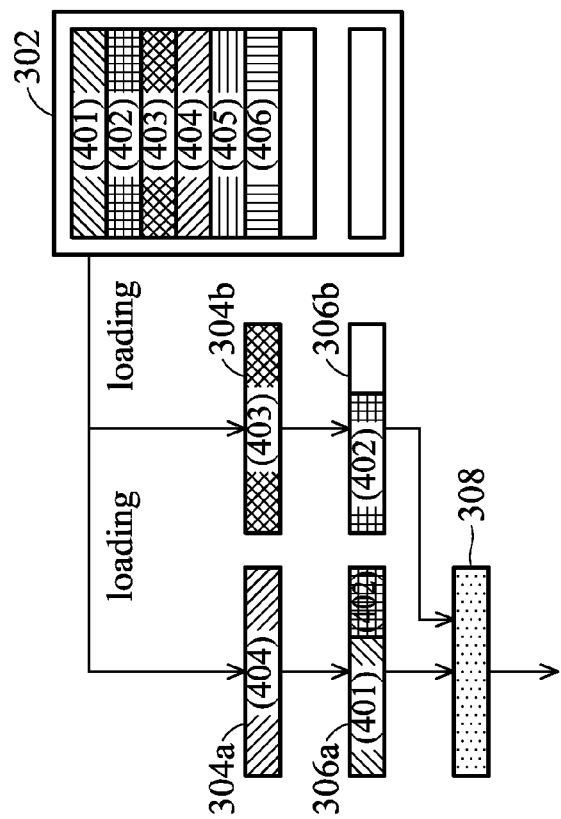
FIG. 4D
FIG. 4C

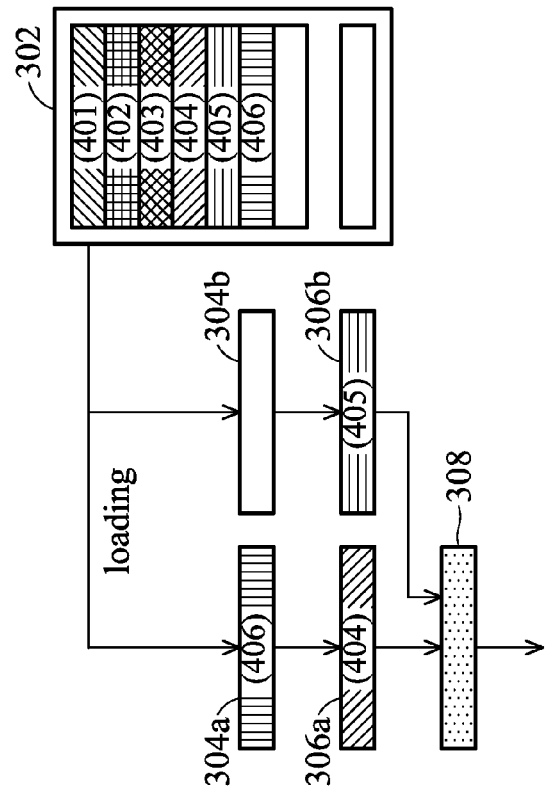
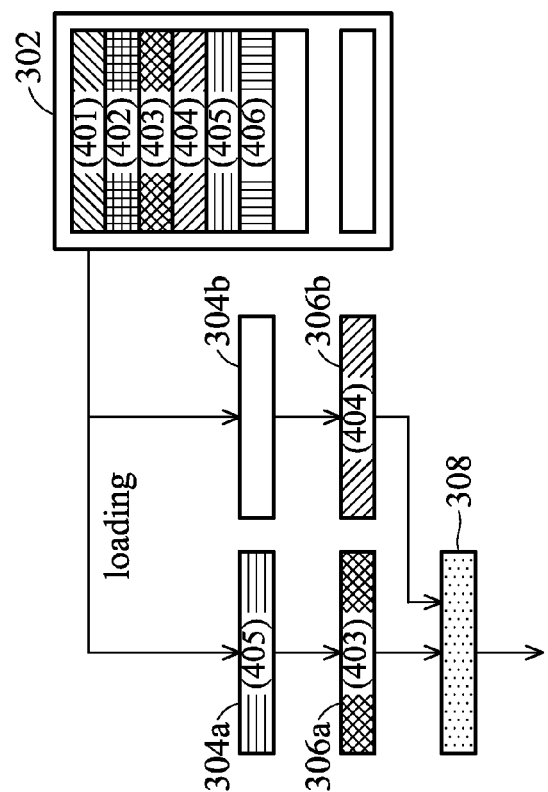

CODE MEMORY CAPABLE OF CODE PROVISION FOR A PLURALITY OF PHYSICAL CHANNELS

CROSS REFERENCE TO RELATED APPLICATIONS

This application is a Continuation-In-Part of U.S. patent application Ser. No. 12/025,076, filed on 4 Feb. 2008, now issued U.S. Pat. No. 7,991,042.

BACKGROUND OF THE INVENTION

1. Field of the Invention

The invention relates to signal correlation, and more particularly to code storing codes for signal correlation.

2. Description of the Related Art

In a communications system such as a Global Positioning System (GPS), both a signal transmitter and a signal receiver must comprise a code generator for code provision. Before raw data is transmitted by a signal transmitter, the signal transmitter modulates the raw data according to a code to obtain a modulated signal. The signal transmitter than sends the modulated signal through the air to a signal receiver. After the signal receiver receives the modulated signal, the signal receiver must then demodulate the received signal before the received signal is further processed. The signal receiver correlates the received signal with a code to demodulate the received signal. Thus, both a transmitter and a receiver of a communication system must comprise a code generator for generating a code for signal processing.

In a GPS system, a code can be generated according to a predetermined algorithm. A code generator of a GPS system therefore has a simple structure for code generation. In one embodiment, a code generator of a GPS system comprises a linear feedback shift register generating a code. A Galileo system, however, adopts a pseudo random sequence as a code for signal processing, such as codes for E1-B and E1-C bands of a Galileo system. Because the E1-B band code and the E1-C band code of a Galileo system cannot be directly generated with a shift register, a code generator of a Galileo system must therefore comprise a code memory for storing the code, before the code generator can then retrieve the code from the code memory for signal processing.

When a signal processor of a receiver processes an input signal, a code with a specific phase is required. A code generator therefore must provide a code with a specific code phase as soon as possible. If the code generator can provide a code with a short delay period, signal processing of the signal processor can be accelerated, and performance of the receiver is improved. In addition, when the signal processor processes different segments of the input signal, code segments with different phases are required. The code generator must therefore provide the code segments with phase jumps therebetween. When the code generator provides the signal processor with a current code segment for correlation, the code generator can simultaneously prepare a subsequent code segment in advance. Thus, when the correlation of the current code segment is completed, the subsequent code segment can then be immediately provided to the signal processor without delay, improving system performance. Thus, a memory code generator capable of generating a correlation code with little delay is required.

In addition, when a receiver processes signals corresponding to a plurality of satellites, a code generator of the receiver must provide codes corresponding to the plurality of satellites. The code generator therefore must comprise a code memory storing a plurality of codes corresponding to the satellites. Because the receiver may simultaneously request the codes corresponding to different satellites, the code memory therefore must comprise a mechanism for handling the requests for codes corresponding to different satellites. A code memory capable of providing codes corresponding to a plurality of satellites is therefore required.

BRIEF SUMMARY OF THE INVENTION

The invention provides a code memory capable of code provision for a plurality of physical channels. In one embodiment, the code memory comprises a multiplexer circuit and a core memory module. The multiplexer circuit performs an OR operation on a plurality of addresses generated by the plurality of physical channels to generate a code memory address signal. The core memory module stores code data, and retrieves the code data according to the code memory address signal to generate a code memory data signal.

The invention also provides a code memory capable of code provision for a plurality of physical channels. In one embodiment, the code memory comprises a selecting multiplexer, a core memory module, and a code buffer. The selecting multiplexer repeatedly latches on to a plurality of addresses generated by the physical channels according to a sequence of the physical channels to generate a code memory address signal. The core memory module stores code data, and retrieves the code data according to the code memory address signal to generate a code memory data signal. The code buffer respectively retrieves a plurality of code segments requested by the physical channels from the code memory data signal according to the sequence of the physical channels, and stores the code segments.

The invention provides a method for code provision for a plurality of physical channels. First, code data is stored in a core memory module. A plurality of addresses generated by the physical channels are then repeatedly latched according to a sequence of the physical channels to generate a code memory address signal. The code data is then retrieved according to the code memory address signal from the core memory module to generate a code memory data signal. A plurality of code segments requested by the physical channels is then retrieved from the code memory data signal according to the sequence of the physical channels. The code segments are then stored in a plurality of buffers.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIGS. 4A~4F are a series of schematic diagrams showing operations of the preparation buffers and the correlation buffers of FIG. 3;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
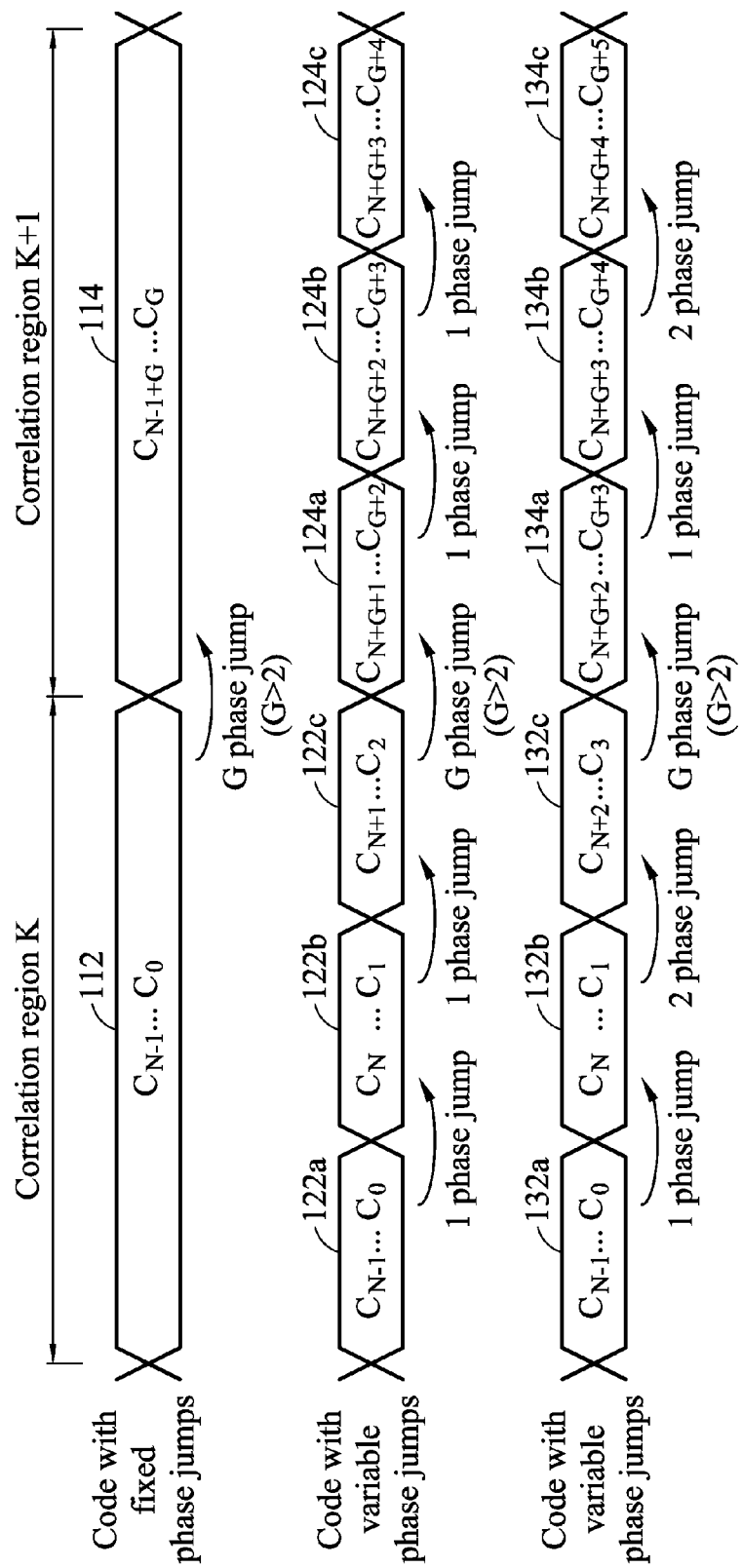
FIG. 1 is a schematic diagram of provided codes with different phase jumps.

When a signal processor processes an input signal according to a code, a code generator must provide the signal processor with the code for correlation. A code generator may be required to provide a code with a fixed phase jump or a variable phase jump. Referring to FIG. 1, a schematic diagram of provided codes with different phase jumps is shown. A code generator provides code segments with different phases in different correlation regions. The phase difference between two adjacent code segments is referred to as a phase jump. In a first embodiment, a code generator is required to provide a code segment 112 corresponding to a current correlation region K and a code segment 114 corresponding to a next correlation region K+1. Compared to the code segment 112 comprising code samples ($C_{N-1}$, . . . , $C_0$), the code segment 114 comprising code samples ($C_{N-1+G}$, . . . , $C_G$) has a fixed phase jump of G samples.

In a second embodiment, the code generator is required to provide three code segments 122a, 122b, and 122c corresponding to a current correlation region K and three code segments 124a, 124b, and 124c corresponding to a next correlation region K+1. The phase jumps between the code segments 122a~122c are of a width of one sample. The phase jump between the code segments 122c and 124a, however, is of a width of G samples. Thus, the code provided by the code generator in the second embodiment has a variable phase jump. In a third embodiment, the phase jump between the code segment 132a and 132b is of a width of one sample, but the phase jump between the code segments 132b and 132c is of a width of 2 samples. Thus, the code provided by the code generator in the third embodiment also has a variable phase jump. A memory code generator must therefore comprise a mechanism for efficiently providing code segments with different phase jumps to meet system requirements.

Figure 2:
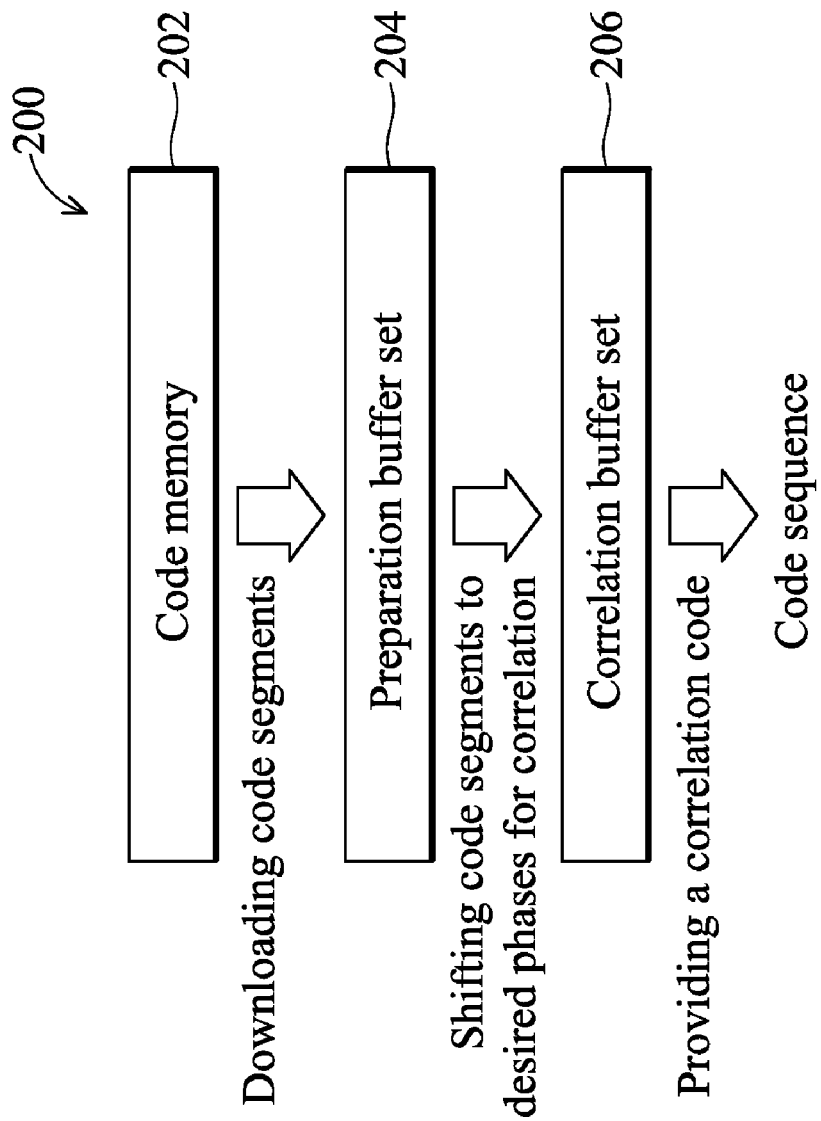
FIG. 2 is a block diagram of a memory code generator providing a correlation code according to the invention.

Referring to FIG. 2, a block diagram of a memory code generator 200 providing a correlation code according to the invention is shown. The memory code generator 200 comprises a code memory 202, a preparation buffer set 204, and a correlation buffer set 206. The preparation buffer set 204 is coupled between the code memory 202 and the correlation buffer set 206. The code memory 202 stores code data. In one embodiment, the code data is for correlation of Galileo E1 band signal. The preparation buffer set 204 retrieves a code segment of the code data from the code memory, and shifting samples of the code segment, thus obtaining a code segment with a desired phase required by the correlation buffer set 206. The correlation buffer set 206 then loads the code segment with a desired phase from the preparation buffer set, and directly provides a correlation code for correlation according to the loaded code segment.

When the correlation buffer set 206 is providing a correlation code for correlation according to a current code segment, the preparation buffer set 204 shifts a subsequent code segment to a desired phase. Thus, after correlation of the current code segment is completed, the preparation buffer set 204 can directly provide the correlation buffer set with the subsequent code segment with no delay, preventing breaks in correlation, to improve system performance.

Figure 3:
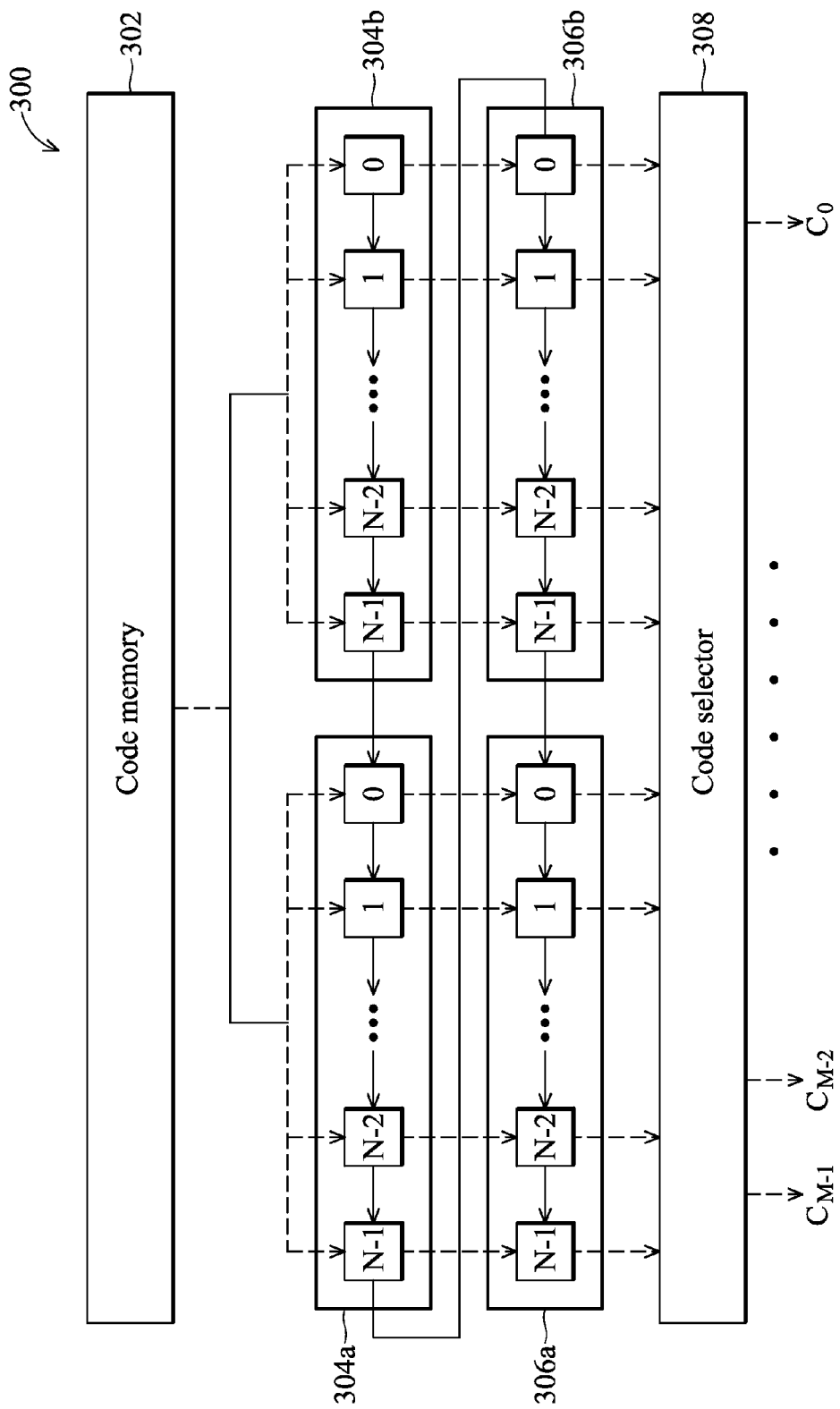
FIG. 3 is a block diagram of an embodiment of a memory code generator according to the invention.

Referring to FIG. 3, a block diagram of an embodiment of a memory code generator 300 according to the invention is shown. The memory code generator 300 comprises a code memory, two preparation buffers 304a and 304b, two correlation buffers 306a and 306b, and a code selector 308. The code memory 302 stores code data. The preparation buffers 304a and 304b form the preparation buffer set 204 of FIG. 2, and the correlation buffers 306a and 306b form the correlation buffer set 206 of FIG. 2. Both the preparation buffers 304a and 304b and the correlation buffers 306a and 306b are shift registers. In addition, the preparation buffers 304a and 304b and the correlation buffers 306a and 306b have a buffer width of N bits and can therefore store an N-bit code segment. In one embodiment, the buffer width N is a word length of the code memory 302, and the preparation buffers 304a and 304b can therefore directly load code words from the code memory 302 with one memory access.

The preparation buffer 304b is coupled to a tail of the preparation buffer 304a. Thus, after the preparation buffers 304a and 304b retrieve two adjacent code segments from the code memory 302, the preparation buffers 304a and 304b can shift phases of the adjacent code segments to a desired phase suitable for correlation. Accordingly, the correlation buffer 306b is coupled to a tail of the correlation buffer 306a. After the correlation buffers 306a and 306b load code segments from the preparation buffer set, the correlation buffers 306a and 306b can still shift phases of the code segments to provide a correlation code with slightly changed code phases. The code selector 308 can then selects an output code ($C_0$, . . . , $C_{M-1}$) from code bits stored in the correlation buffers 306a and 306b and then outputs the code ($C_0$, . . . , $C_{M-1}$) for correlation.

A coupling between the preparation buffer set and the correlation buffer set can be dynamically adjusted. The correlation buffers 306a and 306b are respectively coupled to the preparation buffers 304a and 304b. In a setup mode at initiation of a large phase jump, the correlation buffers 306a and 306b can therefore directly load code segments with desired phases from preparation buffers 304a and 304b. In an intermediate mode subsequent to the setup mode, when all the code loaded to the correlation buffer 306b is shifted to the correlation buffer 306a to leave an empty correlation buffer 306b, the correlation buffer 306b loads a code segment from the preparation buffer 304b. In a normal mode, the head of the preparation buffer 304a is connected to the tail of the correlation buffer 306b, and the code stored in the preparation buffer 304a is shifted to the correlation buffer 306b and then to the correlation buffer 306a. The operation of the preparation buffers 304a and 304b and the correlation buffers 306a and 306b are illustrated in FIGS. 4A~4F and FIG. 5.

Figure 5:
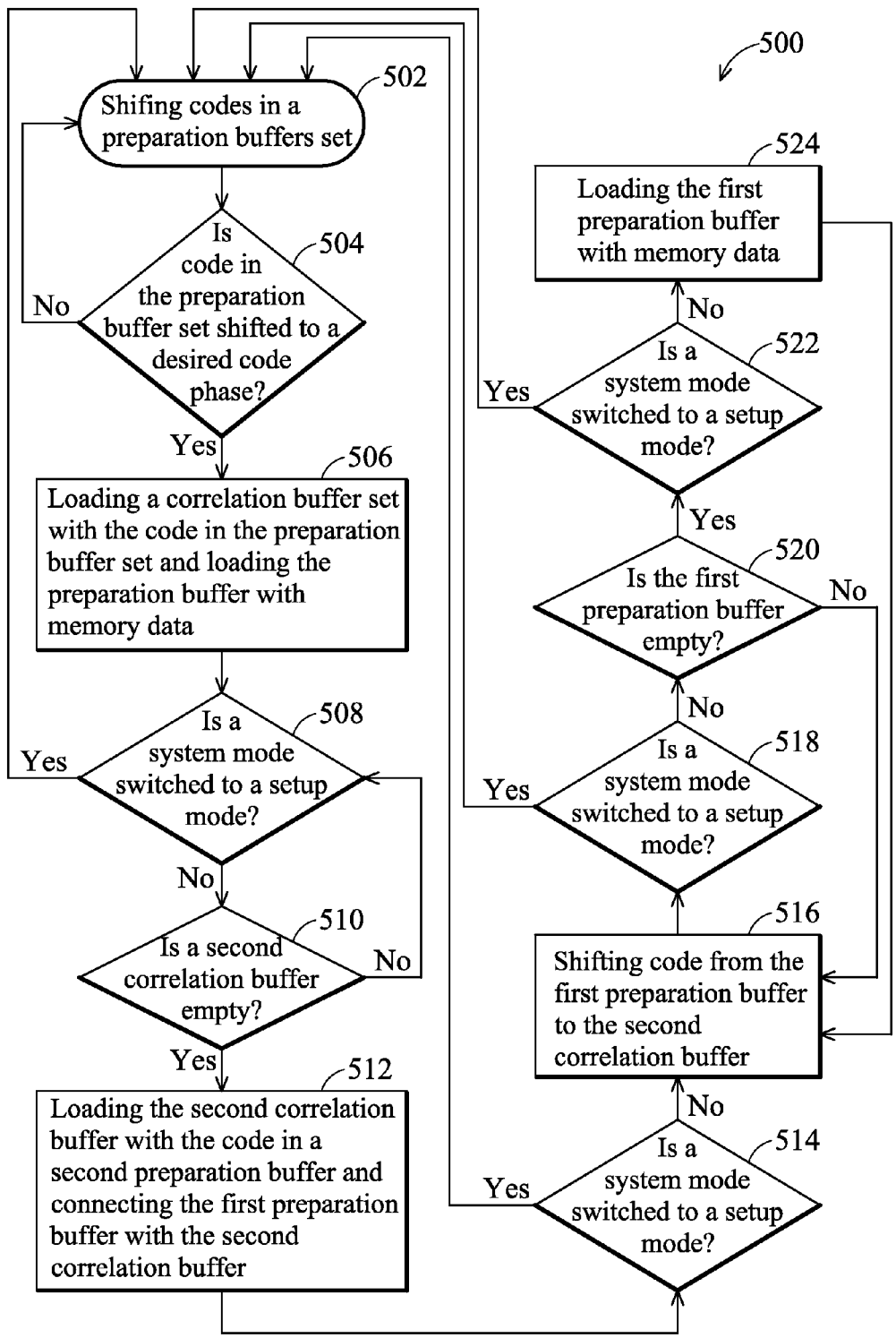
FIG. 5 is a flowchart of a method for operating the preparation buffers and the correlation buffers of FIG. 3.

FIG. 4A~4F are a series of schematic diagrams showing operations of the preparation buffers 304a and 304b and the correlation buffers 306a and 306b of FIG. 3. Meanwhile, FIG. 5 is a flowchart of a method 500 for operating the preparation buffers 304a and 304b and the correlation buffers 306a and 306b of FIG. 3. As aforementioned descriptions, the memory code generator 300 has three operating modes including a setup mode, an intermediate mode, and a normal mode, wherein FIGS. 4A and 4B correspond to the setup mode, FIGS. 4C and 4D correspond to the intermediate mode, and FIGS. 4E and 4F correspond to the normal mode.

When the memory code generator 300 is required to provide a code with a large phase jump, the operating mode of the memory code generator 300 is switched to a setup mode. Assume that the code memory 302 stores a series of code words 401, 402, 403, 404, 405, and 406. Referring to FIG. 4A, in a set-up mode, the preparation buffers 304a and 304b first respectively load a first code word 401 and a second code word 402 from the code memory 302. The preparation buffers 304a and 304b then shift the code words 401 and 402 to obtain a code segment with a code phase required for correlation (steps 502 and 504), as shown in FIG. 4B.

When the code segment stored in the preparation buffers 304a and 304b has a desired code phase for correlation, the memory code generator 300 is switched into a push-to-B operating mode. The correlation buffers 306a and 306b then directly load the code segment from the preparation buffers 304a and 304b, and the preparation buffers 304a and 304b respectively load a fourth code word 404 and a third code word 403 from the code memory 302 (step 506), as shown in FIG. 4C. The correlation buffers 306a and 306b then gradually shifts the code segment stored therein to provide a correlation code. In one embodiment, the code selector 308 selects the code segment stored in the correlation buffer 306a as an output correlation code. After all the code originally stored in the correlation buffer 306b is shifted to the correlation buffer 306a, the correlation buffer 306b is empty (step 510). The correlation buffer 306b then loads the third code word 403 from the preparation buffer 304b (step 512), as shown in FIG. 4D. The head of the preparation buffer 304a is next connected to the tail of the correlation buffer 306b.

Next, the memory code generator 300 is switched to a normal operating mode. Because the head of the preparation buffer 304a is next connected to the tail of the correlation buffer 306b, a chain comprising the preparation buffer 304a, the correlation buffer 306b, and correlation buffer 306a is formed to shift code bits from the preparation buffer 304a to the correlation buffer 306a (step 516). Thus, the code selector 308 can then continue to extract correlation codes with shifted phases from the correlation buffer 306a and 306b. Whenever the preparation code buffer 304a is empty (step 520), the preparation code buffer 304a directly loads a subsequent code word from the code memory 302 as a source shifted to the correlation buffer 306b (step 524), as shown in FIGS. 4E and 4F. Thus, the code selector 308 can continue to provide a code for correlation if a large phase jump is not required.

When a subsequent correlation code with a large phase jump is required, the memory code generator 300 is switched back to a setup mode (steps 508, 514, 518, and 522), and the preparation buffers 304a and 304b load a subsequent correlation code from the code memory 302 and shift the subsequent correlation code to a desired code phase required for correlation when the correlation buffer 306a is still providing the code selector 308 with a current correlation code. Thus, when correlation of the current code is completed, the correlation buffer 306a and 306b can directly load the subsequent code with a large phase jump from the preparation buffer 304a and 304b without delay, and system performance is therefore greatly improved.

There are three code generation situations in FIG. 1. For a first code generation situation of FIG. 1, the memory code generator 300 can repeat operations of the setup mode shown in FIGS. 4A and 4B to generate a memory code with fixed code phase jumps. For a second code generation situation of FIG. 1, the memory code generator 300 can sequentially performs operations of the setup mode, the intermediate mode, and the normal mode shown in FIGS. 4A~4F to generate a memory code with variable code phase jumps. For a third code generation situation of FIG. 1, a memory code with small code phase jumps is required. The memory code generator 300 then generates the memory code with small code phase jumps with the code selector 308, which selects codes with required phase jumps as an output code.

Figure 6A:
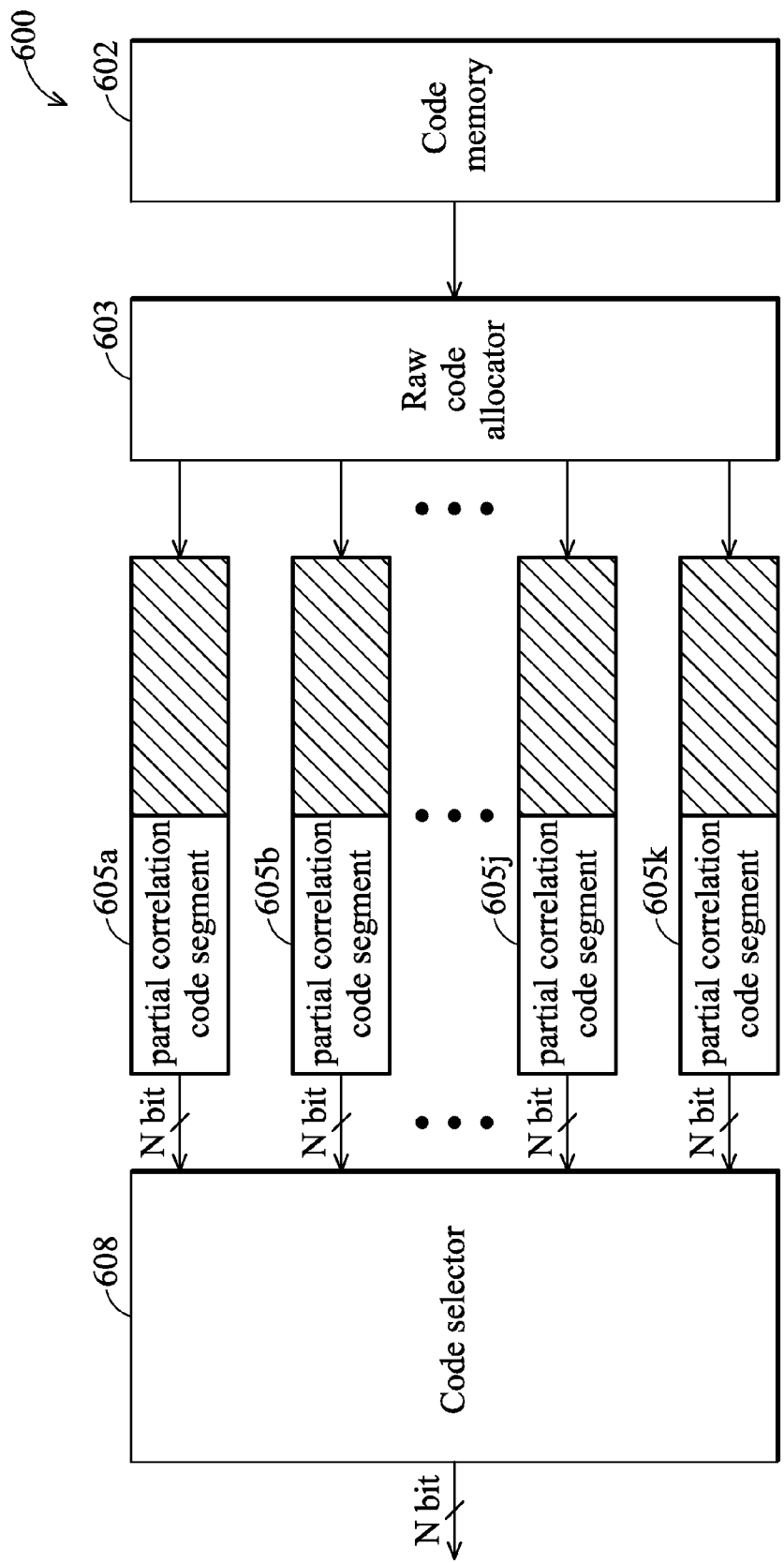
FIG. 6A is a block diagram of an embodiment of a memory code generator according to the invention.

The ping-pong concept for simultaneously operating a correlation buffer set and a preparation buffer set can be further applied to other embodiments of a memory code generator. Referring to FIG. 6A, a block diagram of an embodiment of a memory code generator 600 according to the invention is shown. The memory code generator 600 comprises a code memory 602, a raw code allocator 603, a plurality of code pipes 605a~605k, and a code selector 608. The code memory 602 stores code data. The raw code allocator 603 sequentially retrieves a series of code segments of the code data from the code memory 602 and respectively allocates the code segments to one of the code pipes 605a~605k.

The code pipes 605a~605k respectively store the code segments allocated by the raw code allocator 603. In one embodiment, the code pipes 605a~605k are shift registers. When the code pipes 605a~605k receives code segments from the raw code allocator 603, the code pipes 605a~605k shift the phases of the code segments to desired phases required by the code selector 608 for correlation. The code selector then retrieves the code segments from the code pipes 605a~605k according to the sequence of the code segments to provide a correlation code for correlation. The code pipes 605a~605k, however, do not operate at the same phases. When one of the code pipes 605a~605k is busy providing the code selector 608 with a current code segment as a correlation code as the correlation buffers 306a and 306b of FIG. 3, the other code pipes shift the code segments stored therein to obtain the code segments with desired code phases required by the code selector 608 as the preparation buffers 304a and 304b of FIG. 3. Thus, when correlation of the current code segment is completed, the code selector 608 can directly retrieve a next code segment with a desired phase from one of the code pipes with no delay. In other words, the code pipes 605a~605k dynamically switch between playing the roles of a preparation buffer and a correlation buffer to improve system performance.

Figure 6B:
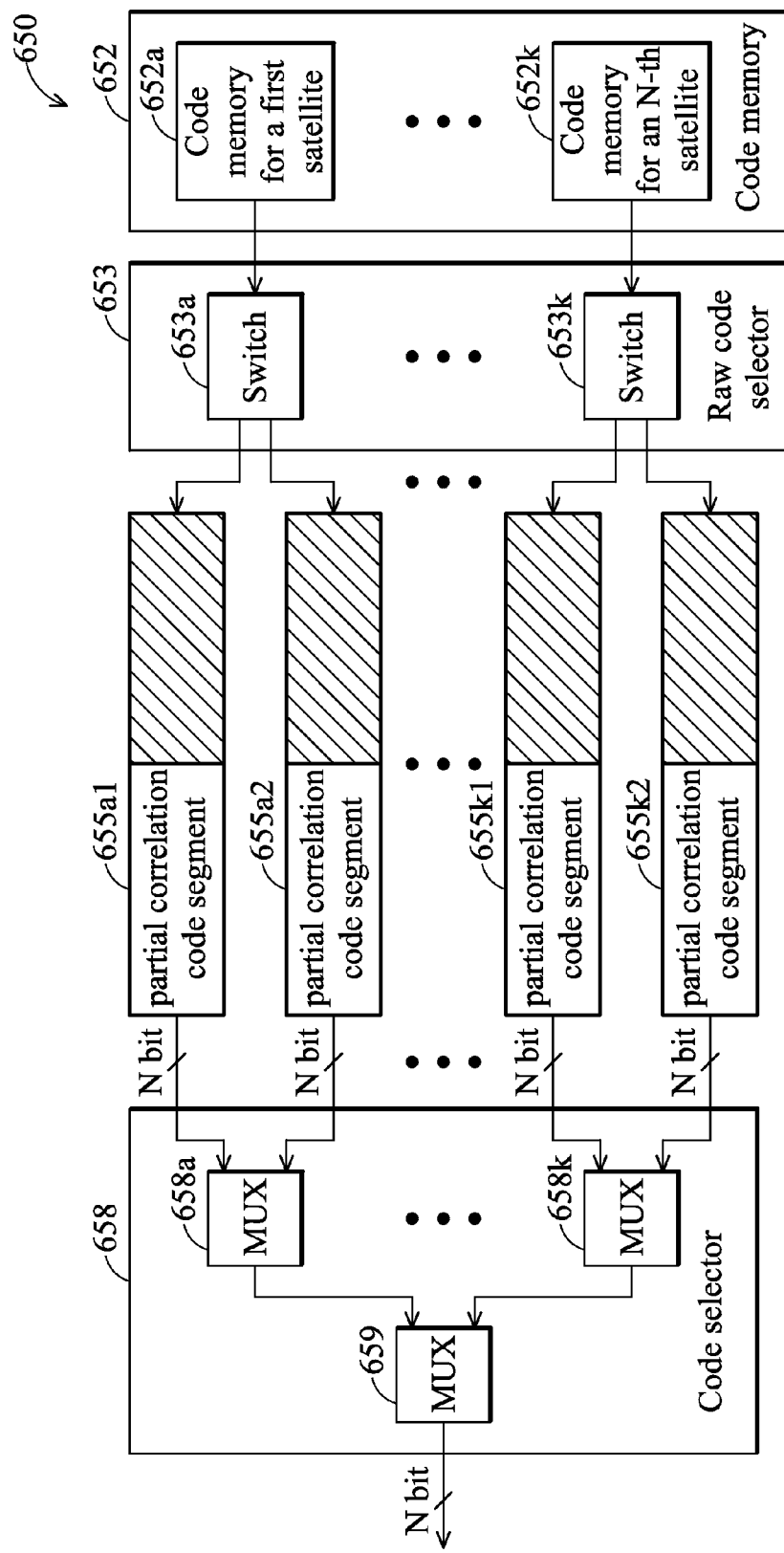
FIG. 6B is a block diagram of another embodiment of a memory code generator capable of providing correlation codes corresponding to a plurality of satellites according to the invention.
Figure 7A:
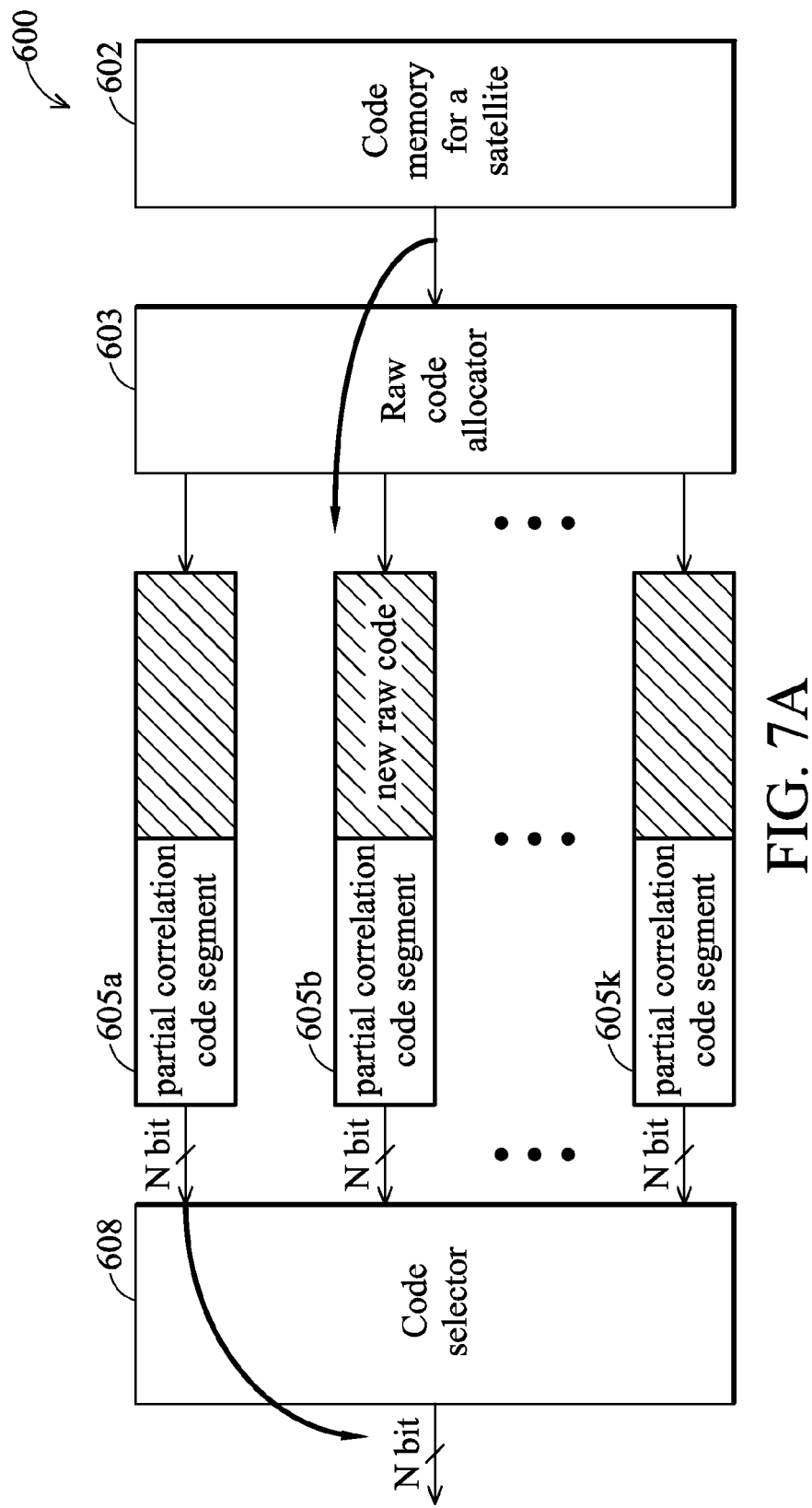
FIGS. 7A~7C are a series of schematic diagrams showing operation of the code pipes of the memory code generator of FIG. 6.
Figure 7B:
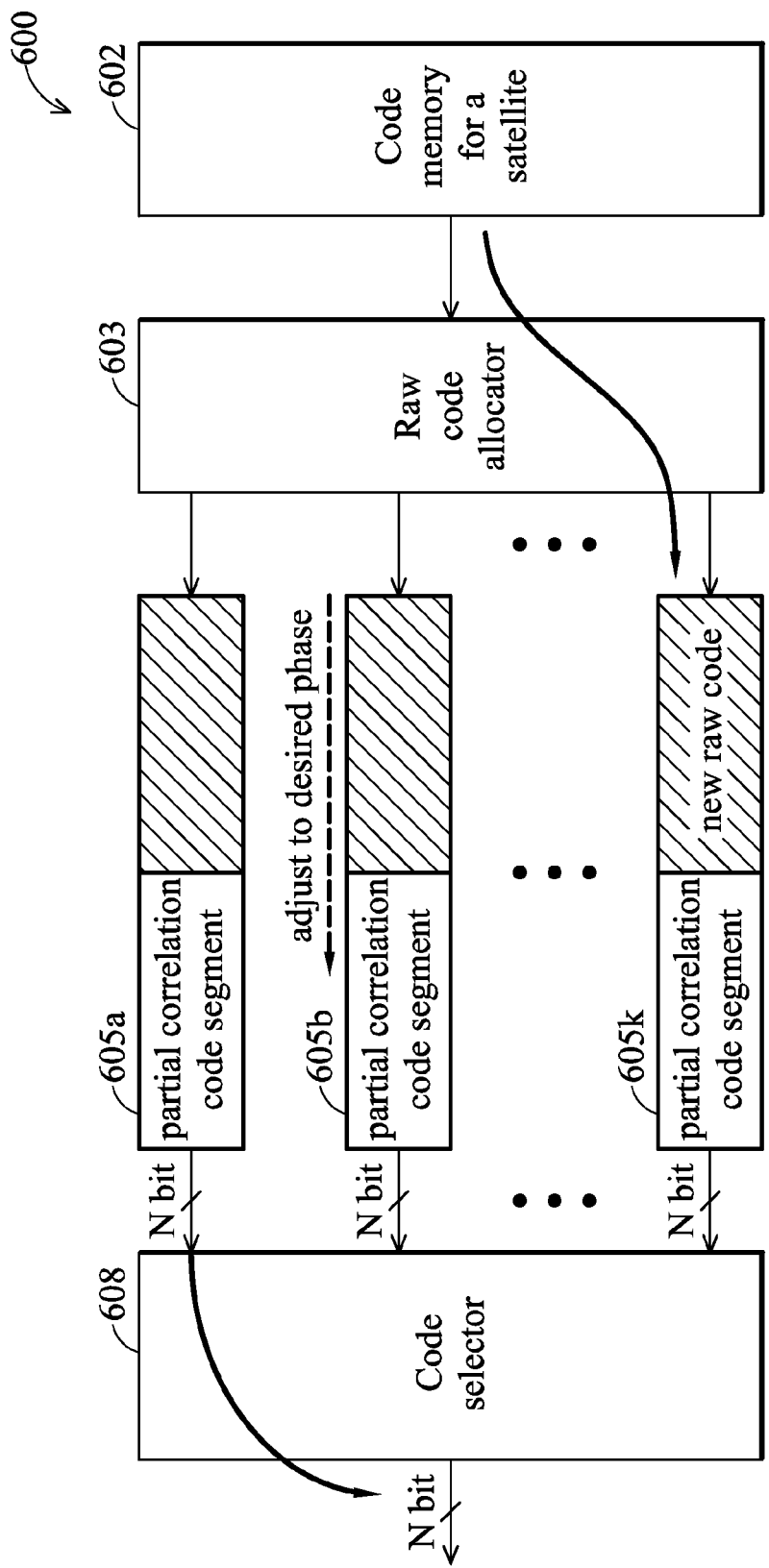
Figure 7C:
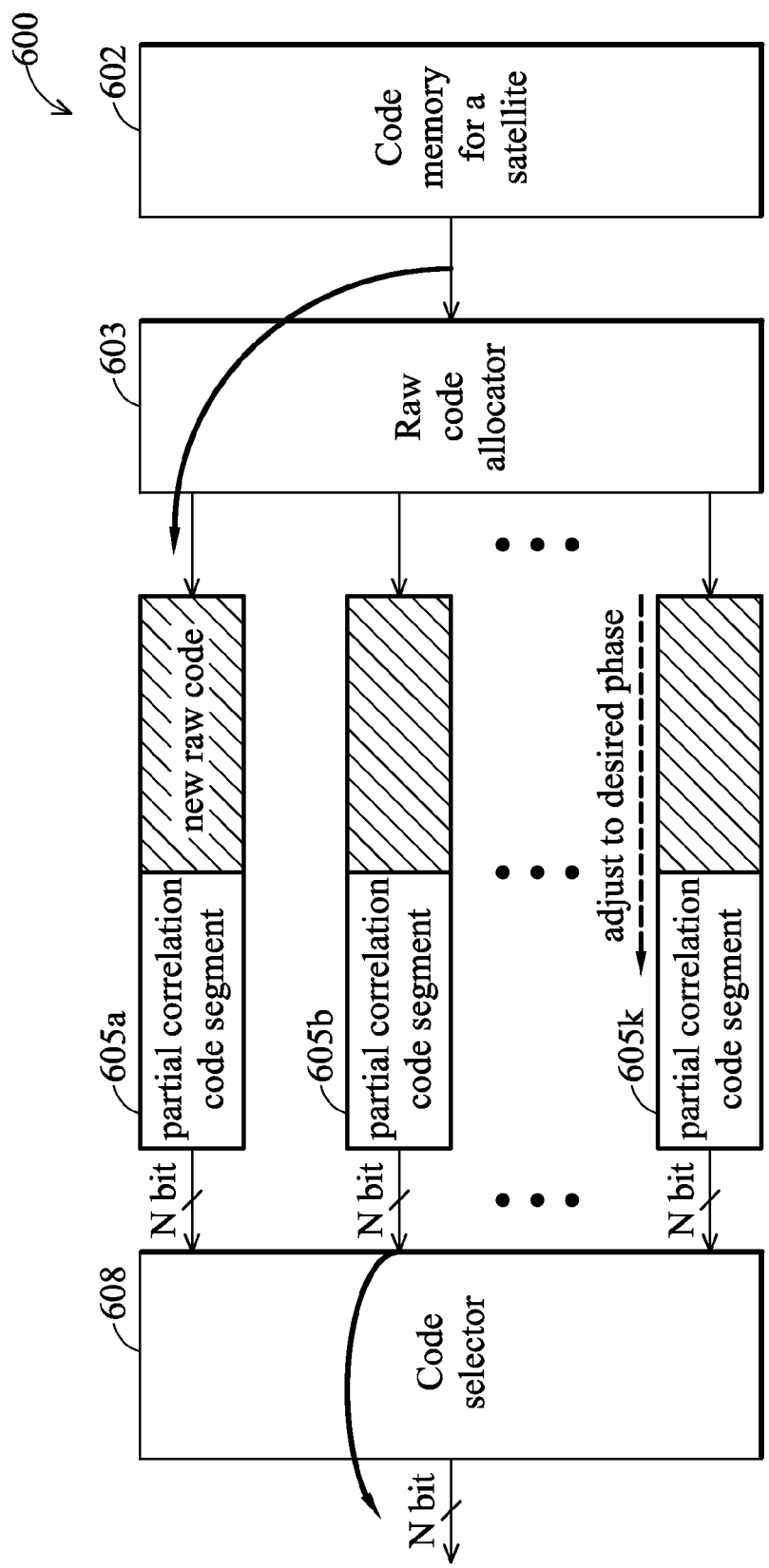

FIGS. 7A~7C are a series of schematic diagrams showing operation of the code pipes 605a~605k of the memory code generator 600 of FIG. 6. Referring to FIG. 7A, a code pipe 605a is playing a role of a correlation buffer providing a code segment stored therein to the code selector 608. Other code pipes except for the correlation buffer 605a play a role of a preparation buffer preparing a code segment with a desired phase. Referring to FIG. 7B, the code pipe 605a is delivering a partial correlation code segment to the code selector 608, the code pipe 605b is shifting the correlation code stored therein to a desired phase, and the code pipe 605k is retrieving a raw code from the raw code allocator 603. Each code pipe handles its correlation code independently, and when a code selector 608 requires a correlation code with a desired phase, one of the code pipes 605a~605k directly provide the code selector 608 with the correlation code without delay. Thus, after correlation of the code segment of the code pipe 605a is completed, the code pipe 605b would then directly provide the code selector 608 with the subsequent code segment with a phase jump without delay.

A receiver sometimes handles signal processing of a plurality of satellites and requires a plurality of correlation codes corresponding to the satellites. Referring to FIG. 6B, a block diagram of another embodiment of a memory code generator 650 capable of providing correlation codes corresponding to a plurality of satellites according to the invention is shown. The memory code generator 650 comprises a code memory 652, a raw code allocator 653, a plurality of code pipe pairs 655a1~605k2, and a code selector 658.

The code memory 652 comprises a plurality of memories 652a~652k. Each of the memories 652a~652k stores a code corresponding to one of a plurality of satellites. Thus, the code memory 652 stores codes corresponding to a plurality of satellites. Each of the code pipe pairs 655a~655k comprises two code pipes. For example, the code pipe 655a comprises code pipes 655a1 and 655a2. In one embodiment, the code pipes 655a1~655k2 are all shift registers. The raw code allocator 653 comprises a plurality of switches 653a~653k, each retrieving a series of code segments corresponding to a satellite from one of the memories 652a~652k, and alternately allocating the code segments to one of the two code pipes of a code pipe pair dedicated to the corresponding satellite.

The two code pipes of a code pipe pair switches between playing roles of a preparation buffer and a correlation buffer. When one of the two code pipes provides the code selector 658 with a shifted code segment with a desired phase, the other of the two code pipes shifts a raw code segment received from the raw code allocator 653 to obtain a shifted code segment with a desired phase required by the code selector 658. The code selector 658 comprises a plurality of multiplexer 658a~658k and an end multiplexer 659. Each of the multiplexers 658a~658k retrieves a shifted code segment from one of the code pipes of a corresponding code pipe pair. Thus, each code pipe pair provides a shifted code segment to the end multiplexer 659. Finally, the end multiplexer 659 selects one of the shifted code segments as an output code for correlation, and the memory code generator 650 therefore can generate any code corresponding to the satellites.

To meet the requirement for handling signals from multiple satellites, a signal receiver often has a plurality of physical channels for respectively searching and tracking one of the multiple satellites. Each physical channel requires a correlation code dedicated to a corresponding satellite for correlation with an input signal received from the corresponding satellite. When a physical channel is for processing a GPS signal, a COMPASS signal, or a GLONASS signal, a code generator can directly generate a correlation code for a GPS signal, a COMPASS signal, or a GLONASS signal with a linear feedback shift register (LFSR). When a physical channel is for processing a Galileo E1 band signal, a correlation code for the Galileo E1 band signal is a pseudo random sequence which cannot be regenerated. A code memory therefore must store the correlation code in advance, before a code generator can then retrieve the correlation code from the code memory to provide the correlation code.

Figure 8:
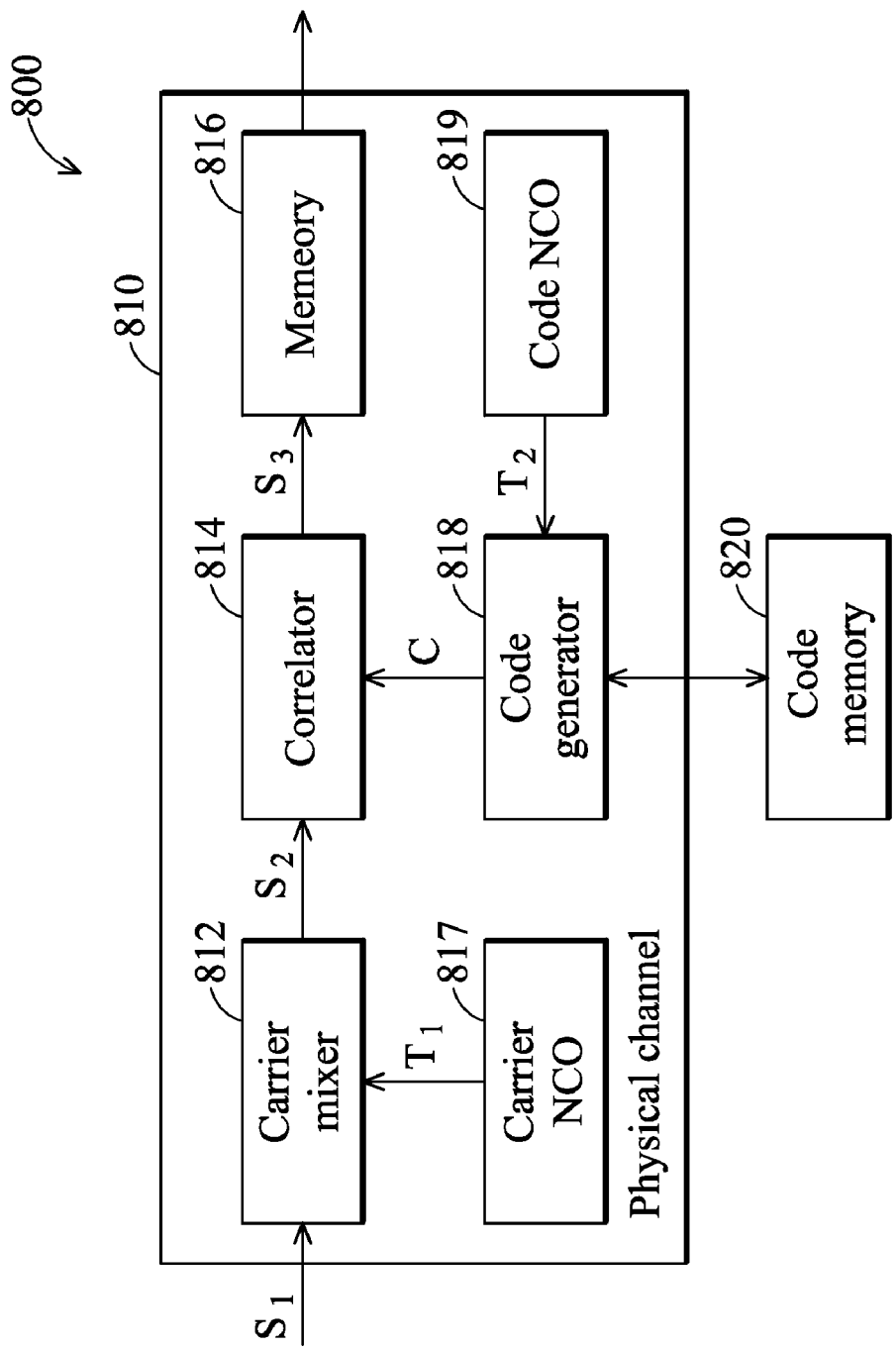
FIG. 8 is a block diagram of a signal receiver comprising a physical channel.

Referring to FIG. 8, a block diagram of a signal receiver 800 comprising a physical channel 810 is shown. In additional to the physical channel 810, the signal receiver 800 further comprises a code memory 820 storing a correlation code. The physical channel 810 comprises a carrier mixer 812, a correlator 814, a memory 816, a carrier numerical code oscillator (NCO) 817, a code generator 818, and a code numerical code oscillator (NCO) 819. The carrier 812 mixes an input signal $S_1$ received by the physical channel 810 with a carrier wave $T_1$ to obtain a signal $S_2$ without a carrier component. The code generator 818 retrieves a correlation code C from the code memory 820 according to the code phase $T_2$ generated by the code NCO 819. The correlator 814 then correlates the signal $S_2$ with the correlation code C to recover a signal $S_3$ without a correlation code component. The signal $S_3$ is next stored in a memory 816 for further processing.

Figure 9:
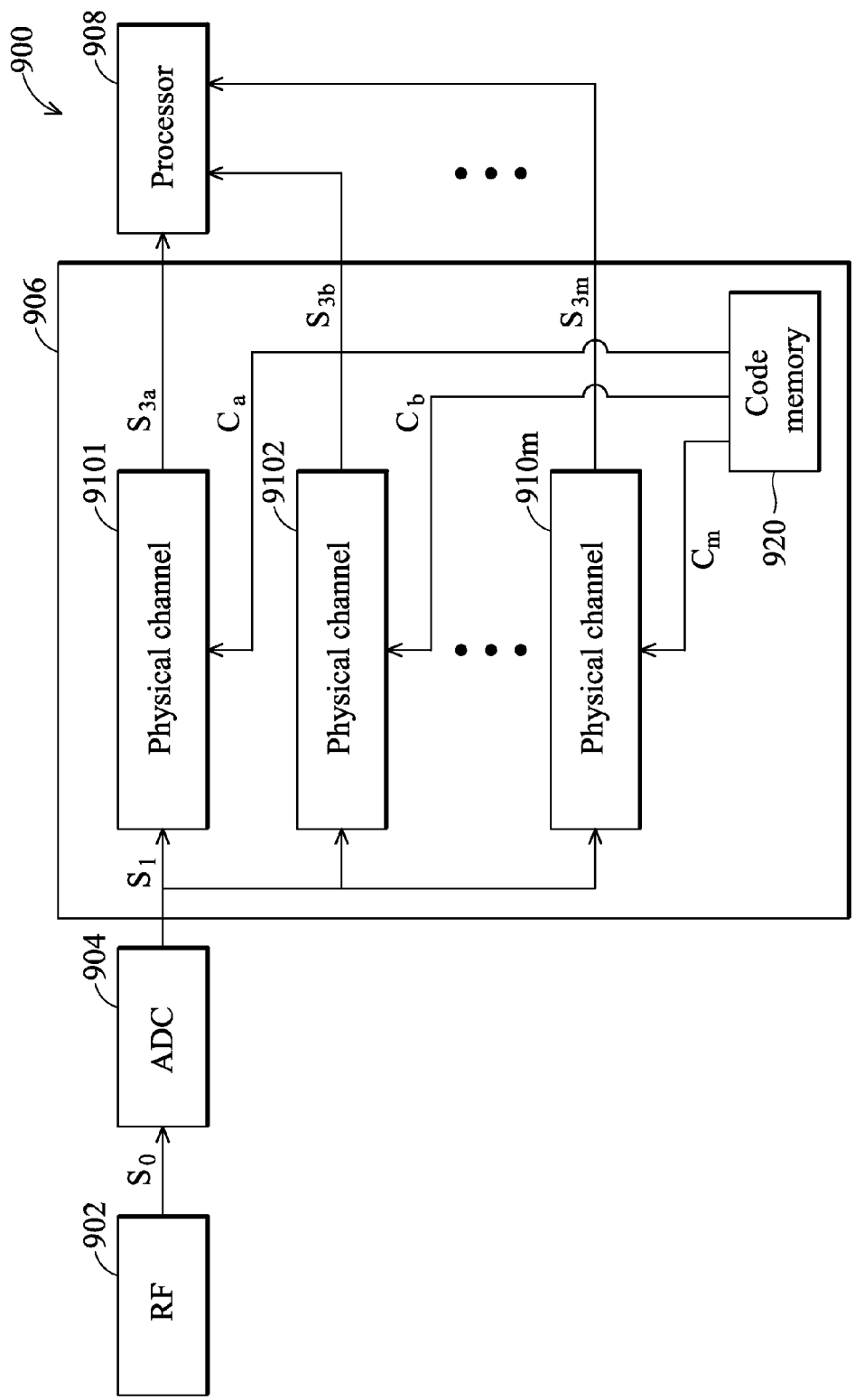
FIG. 9 is a block diagram of a signal receiver comprising multiple physical channels and a code memory.

A code memory has a high hardware cost. When a signal receiver has multiple channels, if the signal receiver has multiple code memories respectively storing correlation codes for the physical channels, the hardware cost of the signal receiver is too high for physically implementation. A code memory therefore must store correlation codes of multiple physical channels and serve as memory access for the multiple physical channels. Referring to FIG. 9, a block diagram of a signal receiver 900 comprising multiple physical channels 9101~910m and a code memory 920 is shown. The physical channels 9101~910m respectively generate code requests to access the code memory 920, and the code memory 920 then respectively generates the codes $C_a, C_b, \ldots, C_m$ delivered to the physical channels 9101~910m in response. The physical channels 9101~910m then respectively correlate the input signal $S_1$ with the correlation codes $C_a, C_b, \ldots, C_m$ to obtain the signals $S_{3a}, S_{3b}, \ldots, S_{3m}$ sent to the processor 908 for further processing.

Figure 10:
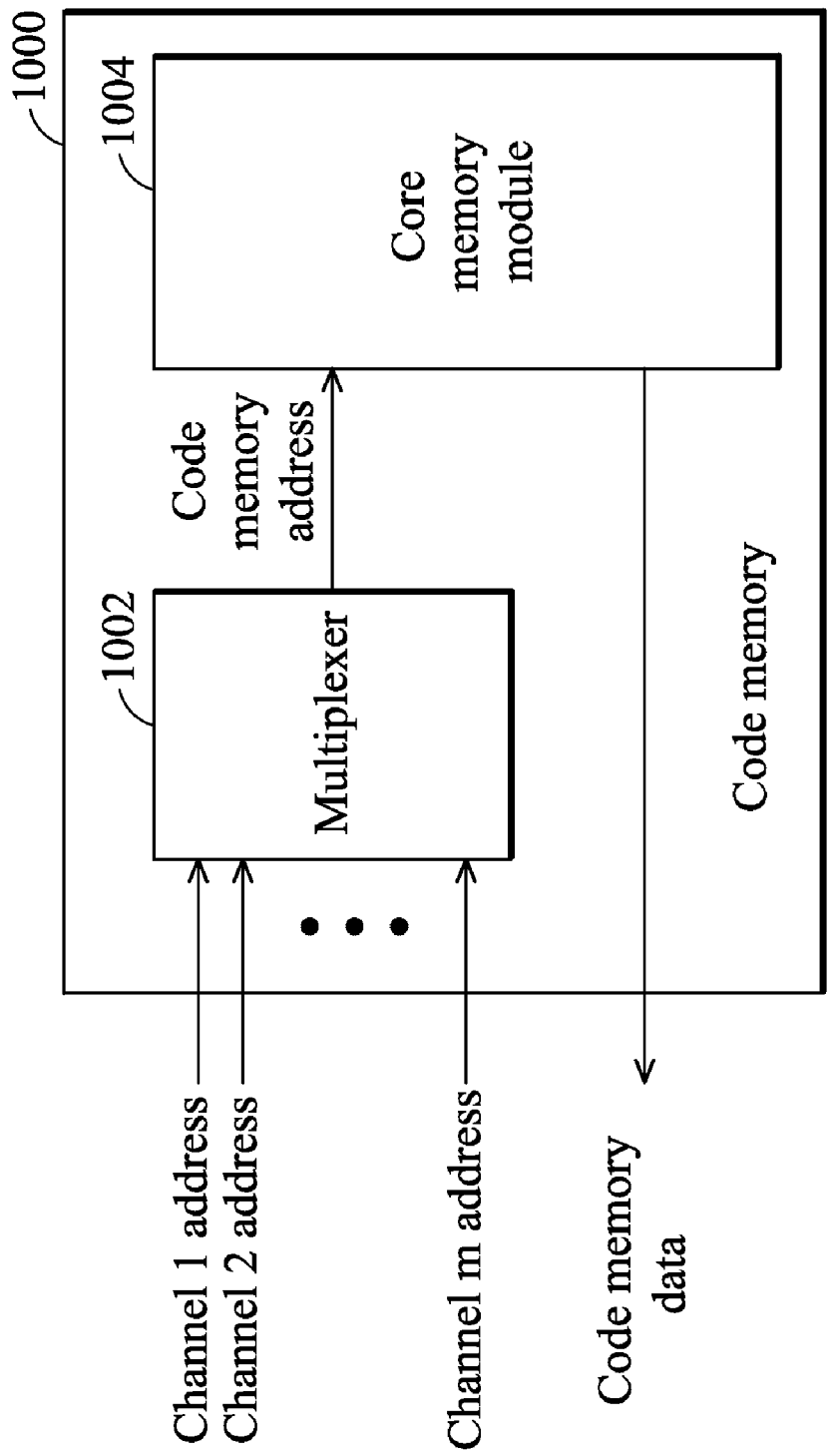
FIG. 10 is a block diagram of a code memory capable of code provision for a plurality of physical channels according to the invention.

A code memory therefore requires a mechanism for handling code requests from multiple physical channels. Referring to FIG. 10, a block diagram of a code memory 1000 capable of code provision for a plurality of physical channels according to the invention is shown. The code memory 1000 comprises a multiplexer circuit 1002 and a core memory module 1004. The core memory module 1004 stores code data corresponding to a plurality of satellites. In one embodiment, the code data stored in the core memory module 1004 is for Galileo E1 band signal correlation. When the multiple physical channels require code for signal correlation, the physical channels generate a plurality of addresses sent to the code memory to request code segments of the code data. The multiplexer circuit 1002 then sequentially selects one of the addresses as a segment of a code memory address signal. In one embodiment, the multiplexer circuit 1002 performs an OR operation on the addresses to obtain the code memory address signal. The core memory module 1004 then retrieves the code segments of the code data according to the code memory address signal to generate a code memory data signal. The physical channels then generate a plurality of latch signals to respectively retrieve previously requested code segments from the code memory data signal for further correlation.

Figure 11:
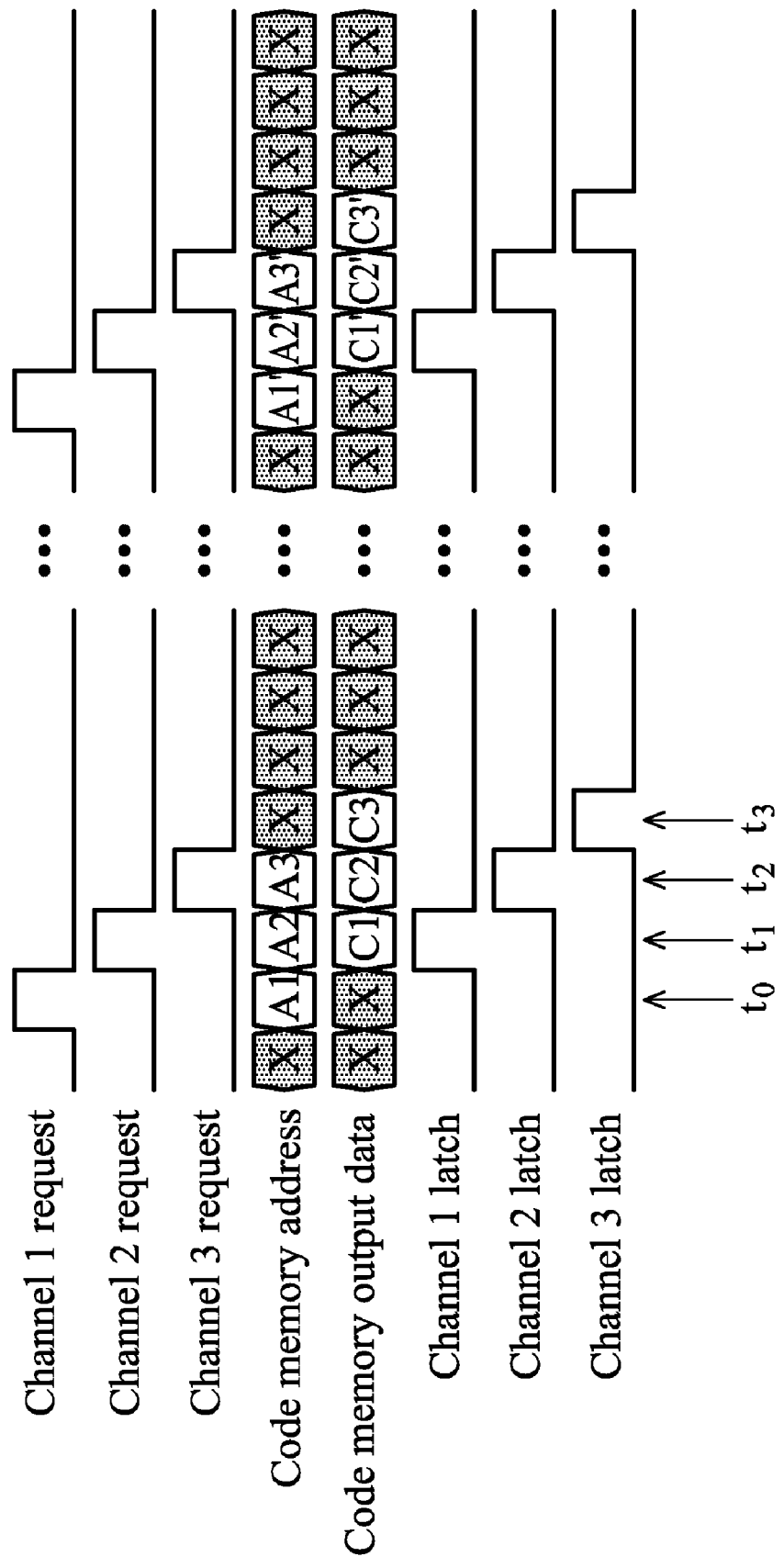
FIG. 11 is a schematic diagram of an embodiment of signals related to the code memory of FIG. 11 according to the invention.

Referring to FIG. 11, a schematic diagram of an embodiment of signals related to the code memory 1000 of FIG. 11 according to the invention is shown. Assume that a signal receiver comprises three physical channels, and the physical channels respectively generate requests for codes and addresses A1, A2, and A3 corresponding to the requested codes at clock cycles $t_0$, $t_1$, and $t_2$. The multiplexer circuit 1002 then performs an OR operation on the addresses sent by the physical channels to obtain a code memory address signal comprising the address A1 at the clock cycle $t_0$, the address A2 at the clock cycle $t_2$, and the address A3 at the clock cycle $t_3$. The core memory module 1004 then retrieves the code data stored therein according to the code memory address signal to generate a code memory data signal, wherein the code memory data signal comprises a code segment C1 corresponding to the address A1 at the clock cycle $t_1$, a code segment C2 corresponding to the address A2 at the clock cycle $t_2$, and a code segment C3 corresponding to the address A3 at the clock cycle $t_3$. The physical channels then respectively generate latch signals respectively enabled at the clock cycles $t_1$, $t_2$, and $t_3$ to respectively latch on to the code segments C1, C2, and C3 from the code memory data signal.

Although the code memory 1000 has a simple structure, the code memory 1000 still has limitations. Because the multiplexer circuit 1002 performs an OR operation on the addresses sent by the physical channels to generate the code memory address signal, the physical channels can not generate the addresses at the same clock cycle, otherwise the code memory address signal would be generated with errors. In addition, the physical channels cannot enable the latch signals at the same clock cycle to latch on to the requested code data from the code memory data signal. The physical channels therefore must have a mechanism, which prevents the addresses from being generated at the same time, complicating the circuit design of the physical channels.

Figure 12:
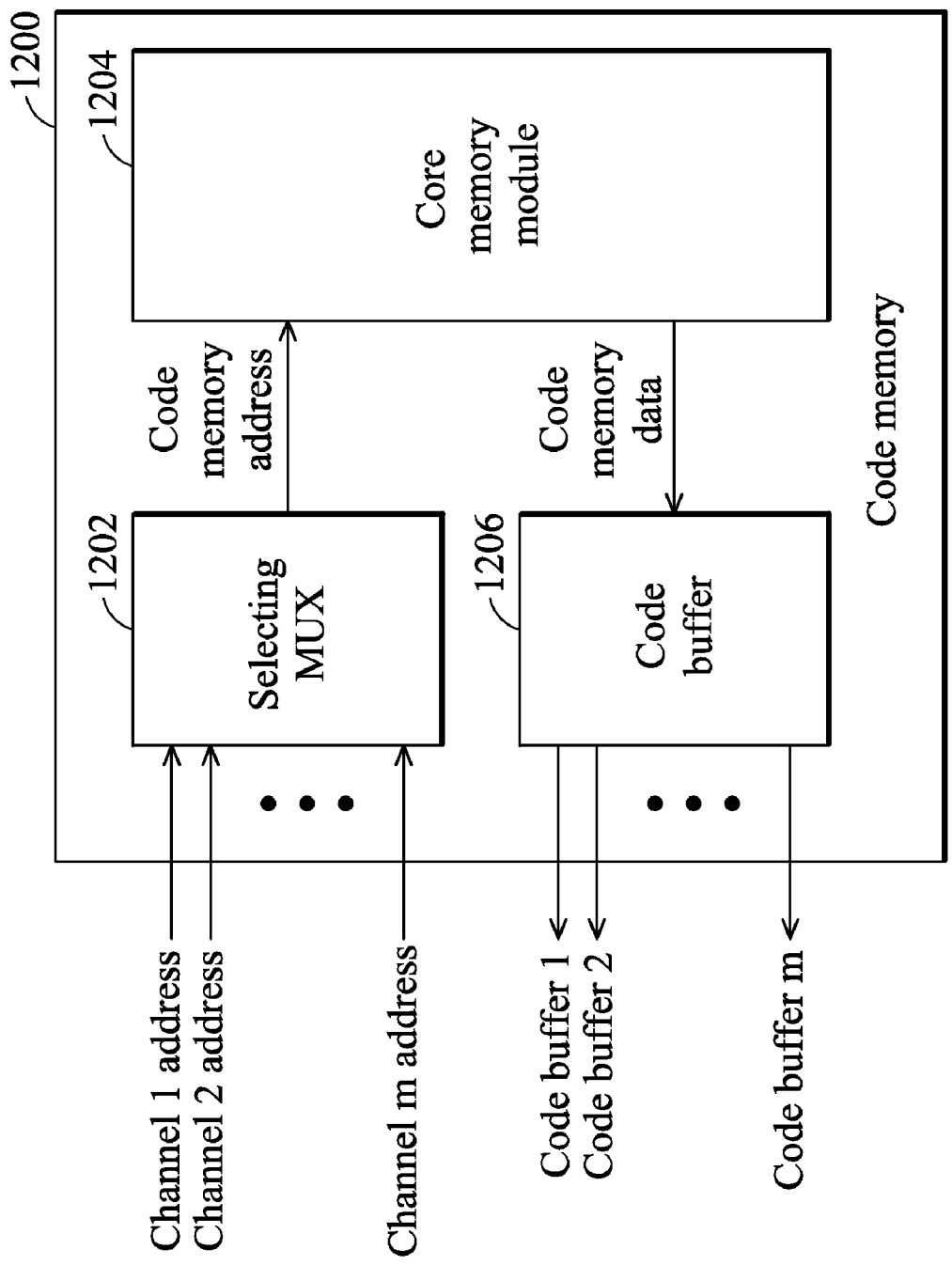
FIG. 12 is a block diagram of a code memory capable of code provision for a plurality of physical channels according to the invention.
Figure 13:
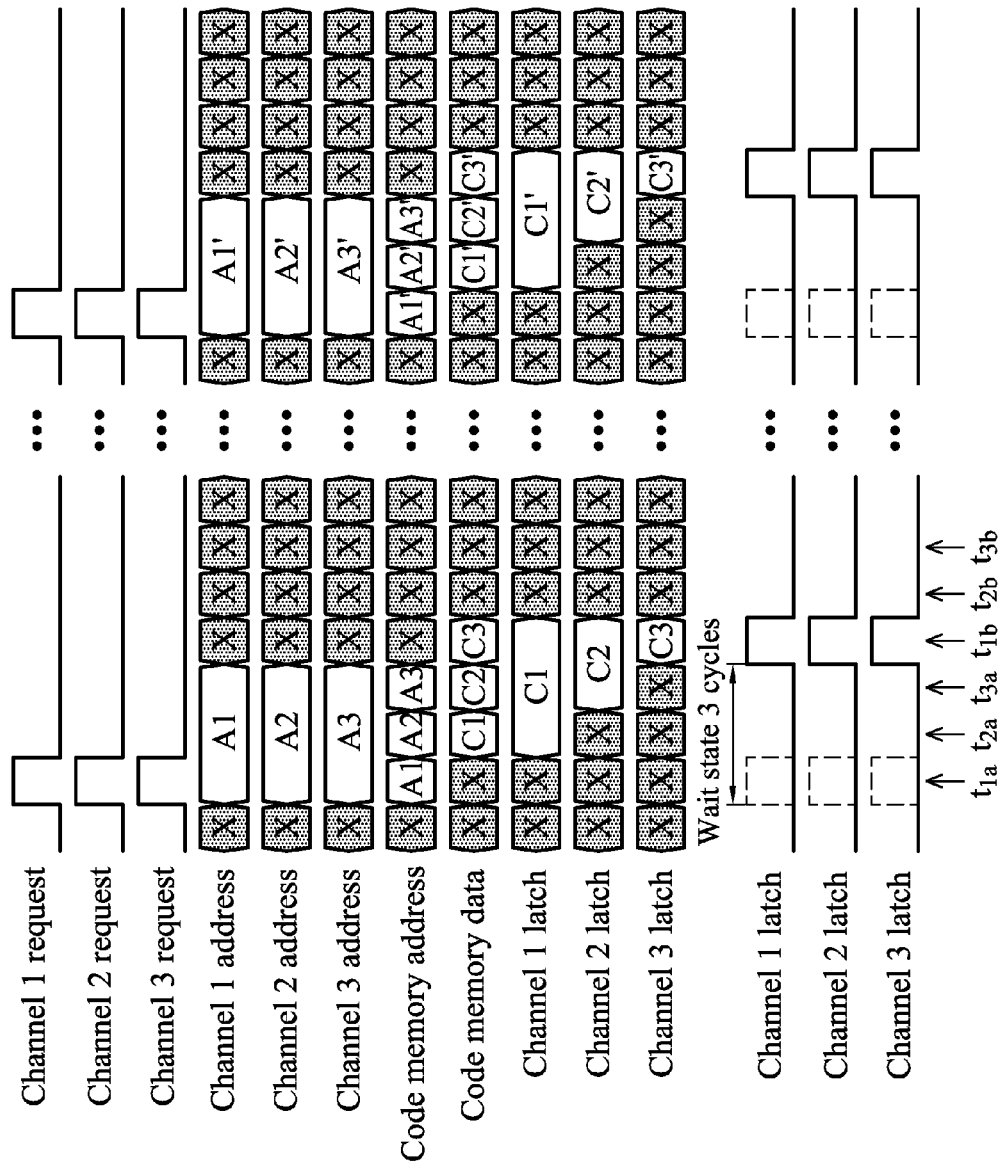
FIG. 13 is a schematic diagram of an embodiment of signals related to the code memory of FIG. 12 according to the invention.

A code memory capable of accepting memory accesses simultaneously generated by a plurality of physical channels is therefore required. Referring to FIG. 12, a block diagram of a code memory 1200 capable of code provision for a plurality of physical channels according to the invention is shown. The code memory 1200 comprises a selecting multiplexer 1202, a core memory module 1204, and a code buffer 1206. Referring to FIG. 13, a schematic diagram of an embodiment of signals related to the code memory 1200 of FIG. 12 according to the invention is shown. Assume that a signal receiver comprises three physical channels, and the physical channels respectively generate requests for code segments and addresses A1, A2, and A3 corresponding to the code segments at the same clock cycle $t_{a1}$. Because the number of the physical channels are three, the addresses A1, A2, and A3 have a duration equal to three times of a clock cycle.

After the physical channels send a plurality of addresses corresponding to the required code segments to the code memory 1200, the selecting multiplexer 1202 repeatedly latches on to the addresses generated by the physical channels according to a predetermined sequence of the physical channels to generate a code memory address signal. For example, a series of clock cycles $t_{1a}$, $t_{2a}$, $t_{3a}$, $t_{1b}$, $t_{2b}$, and $t_{3b}$ are generated, and the selecting multiplexer 1202 latches on to the address generated by a first channel at the clock cycles $t_{1a}$ and $t_{1b}$, latches on to the address generated by a second channel at the clock cycles $t_{2a}$ and $t_{2b}$, and latches on to the address generated by a third channel at the clock cycles $t_{3a}$ and $t_{3b}$. Because the addresses generated by the physical channels have a duration of three clock cycles, the addresses can always be latched on to by the selecting multiplexer 1202 as a portion of the code memory address signal. Thus, the selecting multiplexer 1202 respectively latches on to the addresses A1, A2, and A3 shown in FIG. 13 at clock cycles $t_{1a}$, $t_{2a}$, and $t_{3a}$ to obtains a code memory address signal comprising the address A1 at the clock cycle $t_{1a}$, the address A2 at the clock cycle $t_{2a}$, the address A3 at the clock cycle $t_{3a}$.

The core memory module 1204 stores code data corresponding to the plurality of physical channels. In one embodiment, the code data stored in the core memory module 1204 is for a Galileo E1 band signal correlation. When the core memory module 1204 receives the code memory address signal, the core memory module 1204 retrieves the code data according to the code memory address signal to generate a code memory data signal. A code memory data signal shown in FIG. 13 therefore comprises a code segment C1 at the clock cycle $t_{2a}$, a code segment C2 at the clock cycle $t_{3a}$, and a code segment C3 at the clock cycle $t_{1b}$, wherein the code segments C1, C2, and C3 respectively corresponds to the addresses A1, A2, and A3.

The code buffer 1206 comprises a plurality of buffers respectively corresponding to the physical channels. When the code buffer 1206 receives the code memory data signal, the code buffer 1206 respectively retrieves a plurality of code segments requested by the physical channels from the code memory data signal according to the sequence of the physical channels, and stores the code segments in the corresponding buffers. For example, the code buffer 1206 retrieves a code segment C1 from the code memory data signal at the clock cycle $t_{2a}$ and stores the code segment C1 in a first buffer, as shown in FIG. 13. The code buffer 1206 then respectively retrieves code segments C2 and C3 from the code memory data signal at the clock cycles $t_{3a}$ and $t_{1b}$ and respectively stores the code segments C2 and C3 in a second buffer and a third buffer, as shown in FIG. 13.

The physical channels then generate a plurality of latch signals to respectively retrieve the code segments C1, C2, and C3 from the corresponding buffers. Because the duration of addresses A1, A2, and A3 is extended to the clock cycle $t_{3a}$, the physical channels enable the latch signals at the clock cycle $t_{1b}$ subsequent to the clock cycle $t_{3a}$ to retrieve the code segments from the code buffer 1206. The code buffer 1206 then clears the buffers at the clock cycle $t_{2b}$ after the code segments are retrieved. Thus, although the physical channels generate code requests at the same clock cycle $t_{1a}$, the code memory 1200 can still normally handle the code requests and generate the code segments. In addition, the physical channels can also generate latch signals to retrieve the code segments from the code memory 1200 at the same clock cycle $t_{1b}$. The design of the physical channels is therefore simplified and hardware costs of the signal receiver are reduced.

Figure 14:
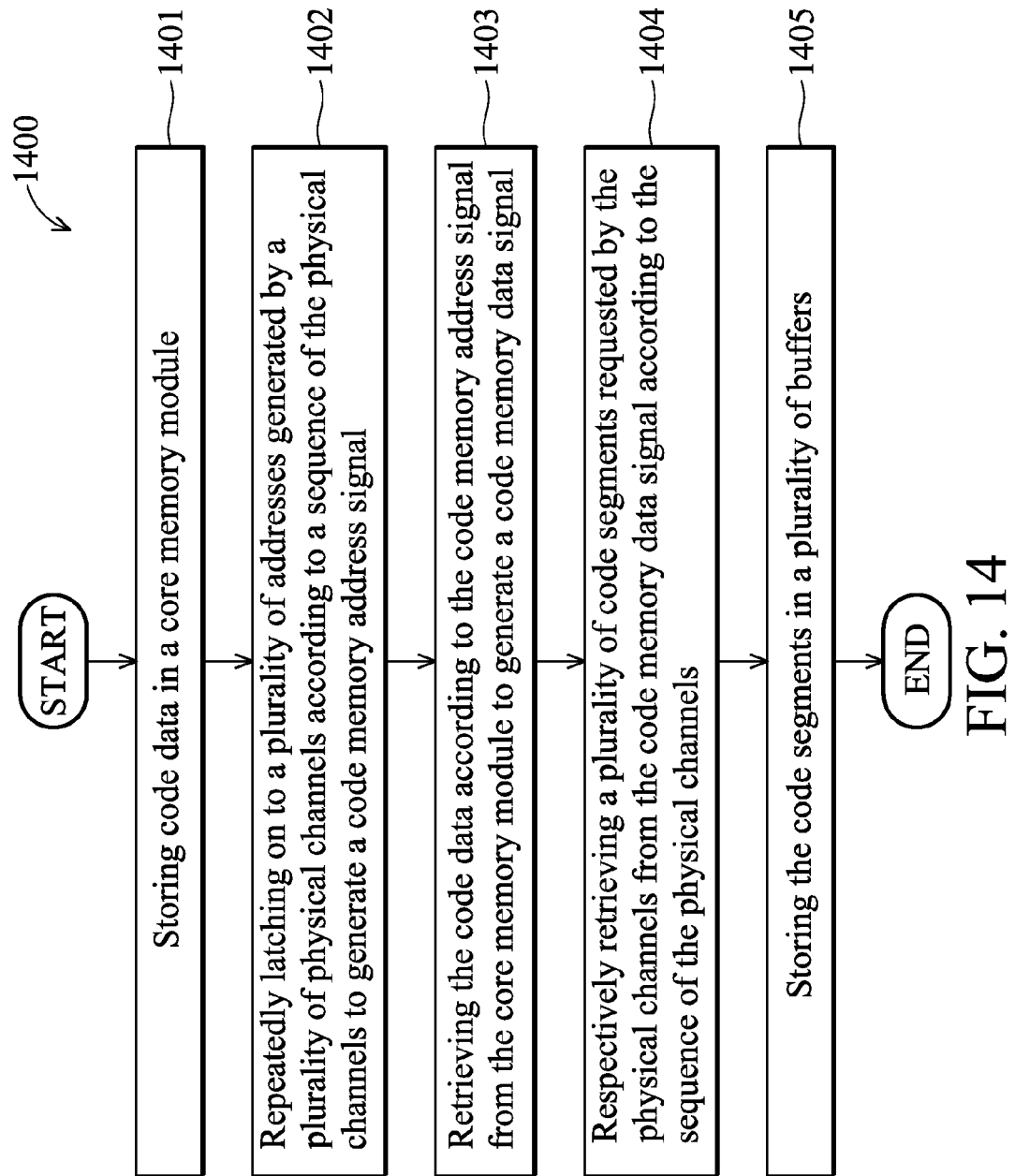
FIG. 14 is a flowchart of a method for code provision for a plurality of physical channels according to the invention.

Referring to FIG. 14, a flowchart of a method 1400 for code provision for a plurality of physical channels according to the invention is shown. First, code data is stored in a core memory module 1204 (step 1401). The selecting multiplexer 1202 then repeatedly latches on to a plurality of addresses generated by a plurality of physical channels according to a sequence of the physical channels to generate a code memory address signal (step 1402). The core memory module 1204 then retrieves the code data according to the code memory address signal from the core memory module to generate a code memory data signal (step 1403). The code buffer 1206 then respectively retrieves a plurality of code segments requested by the physical channels from the code memory data signal according to the sequence of the physical channels (step 1404). Finally, the code buffer 1206 stores the code segments in a plurality of buffers (step 1405), and the physical channels respectively access the code segments from the buffers.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A code memory, capable of code provision for a plurality of physical channels, comprising:
   a multiplexer circuit, performing an operation on a plurality of addresses generated by the plurality of physical channels to generate a code memory address signal; and
   a core memory module, coupled to the multiplexer circuit, storing code data, and retrieving the code data according to the code memory address signal to generate a code memory data signal.

2. The code memory as claimed in claim 1, wherein the physical channels are respectively dedicated to signal processing corresponding to one of a plurality of satellites, and the code data stored in the core memory module comprises code data corresponding to the plurality of satellites.

3. The code memory as claimed in claim 1, wherein the physical channels do not generate the addresses at the same time.

4. The code memory as claimed in claim 1, wherein the physical channels generate a plurality of latch signals to respectively retrieve code data requested by the corresponding addresses from the code memory data signal.

5. The code memory as claimed in claim 4, wherein the physical channels perform correlation between received signals thereof with the code data latched by the latch signals.

6. The code memory as claimed in claim 4, wherein the physical channels generate the latch signals without enabling the latch signals at the same time.

7. The code memory as claimed in claim 1, wherein the code data stored in the core memory module is for a Galileo E1 band.

8. A code memory, capable of code provision for a plurality of physical channels, comprising:
   a selecting multiplexer, repeatedly latching on to a plurality of addresses generated by the physical channels according to a sequence of the physical channels to generate a code memory address signal;
   a core memory module, coupled to the selecting multiplexer, storing code data, and retrieving the code data according to the code memory address signal to generate a code memory data signal; and
   a code buffer, respectively retrieving a plurality of code segments requested by the physical channels from the code memory data signal according to the sequence of the physical channels, and storing the code segments.

9. The code memory as claimed in claim 8, wherein the physical channels generate a plurality of latch signals to respectively retrieve the code segments from the code buffer.

10. The code memory as claimed in claim 9, wherein the addresses have duration equal to N times of a clock cycle, and the physical channels generate the latch signals subsequent to duration of the addresses, wherein N is a number of the physical channels.

11. The code memory as claimed in claim 8, wherein the code buffer comprises a plurality of buffers respectively storing the code segments for the physical channels, and the code buffer clears the buffers after the physical channels retrieve the buffered data from the buffers.

12. The code memory as claimed in claim 8, wherein the physical channels are respectively dedicated to signal processing corresponding to one of a plurality of satellites, and the coda data stored in the core memory module comprises code data corresponding to the plurality of satellites.

13. The code memory as claimed in claim 8, wherein the physical channels generate the addresses at the same time.

14. The code memory as claimed in claim 8, wherein the physical channels perform correlation between received signals thereof with the code segments.

15. The code memory as claimed in claim 8, wherein the code data stored in the core memory module is for a Galileo E1 band.

16. A method for code provision for a plurality of physical channels, comprising:
   storing code data in a core memory module;
   repeatedly latching on to a plurality of addresses generated by the physical channels according to a sequence of the physical channels to generate a code memory address signal;
   retrieving the code data according to the code memory address signal from the core memory module to generate a code memory data signal;
   respectively retrieving a plurality of code segments requested by the physical channels from the code memory data signal according to the sequence of the physical channels; and
   storing the code segments in a plurality of buffers.

17. The method as claimed in claim 16, wherein the physical channels generate a plurality of latch signals to respectively retrieve the code segments from the buffers.

18. The code memory as claimed in claim 16, wherein the addresses have duration equal to N times of a clock cycle, and the physical channels generate the latch signals subsequent to duration of the addresses, wherein N is a number of the physical channels.

19. The method as claimed in claim 17, wherein the method further comprises clearing the buffers after the physical channels retrieve the buffered data from the buffers.

20. The method as claimed in claim 16, wherein the physical channels are respectively dedicated to signal processing corresponding to one of a plurality of satellites, and the coda data stored in the core memory module comprises code data corresponding to the plurality of satellites.

21. The method as claimed in claim 16, wherein the physical channels perform correlation between received signals thereof with the code segments.

22. The code memory as claimed in claim 16, wherein the code data stored in the core memory module is for a Galileo E1 band.

* * * * *